United States Patent
Davis et al.

(10) Patent No.: US 7,498,388 B2
(45) Date of Patent: Mar. 3, 2009

(54) POLYSILOXANE-POLYCARBONATE COPOLYMER ARTICLE

(75) Inventors: Gary Charles Davis, Albany, NY (US); James Alan Mahood, Evansville, IN (US); Matthew Robert Pixton, Mt. Vernon, IN (US); Niles Richard Rosenquist, Evansville, IN (US); James Manio Silva, Clifton Park, NY (US); Joshua James Stone, Worcester, NY (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 309 days.

(21) Appl. No.: 11/401,171

(22) Filed: Apr. 10, 2006

(65) Prior Publication Data

US 2007/0238846 A1 Oct. 11, 2007

(51) Int. Cl.
*C08F 283/02* (2006.01)

(52) U.S. Cl. .................................................. 525/464

(58) Field of Classification Search ........................ None
See application file for complete search history.

(56) References Cited

U.S. PATENT DOCUMENTS

| | | | | |
|---|---|---|---|---|
| 4,600,632 | A | * | 7/1986 | Paul et al. ................... 428/220 |
| 5,504,177 | A | * | 4/1996 | King et al. .................... 528/29 |
| 5,530,083 | A | | 6/1996 | Phelps et al. |
| 6,072,011 | A | * | 6/2000 | Hoover ....................... 525/464 |
| 6,723,864 | B2 | | 4/2004 | Silva et al. |
| 6,833,422 | B2 | | 12/2004 | Silva et al. |
| 6,870,013 | B2 | | 3/2005 | Silva et al. |
| 2004/0220330 | A1 | | 11/2004 | DeRudder et al. |
| 2006/0142527 | A1 | | 6/2006 | Glasgow et al. |

FOREIGN PATENT DOCUMENTS

EP 0500131 A2 8/1992

OTHER PUBLICATIONS

Pixton, Matthew, et al.; Structure Property Relationships in Polycarbonate/polydimethylsiloxane Copolymers; Presentation at 8th Brazilian Polymer Congress; Nov. 6-10, 2005; Abstract (presented by organizers); pp. 1-2.
ASTM D 256-05a; Standard Test Methods for Determining the Izod Pendulum Impact Resistance of Plastics.
International Search Report and Written Opinion of the International Searching Authority; International Application No. PCT/US2007/064870; International Filing Date Mar. 26, 2007; Applicant's File Reference 08CL204872 (P01-0004); Date of Mailing Sep. 10, 2007; 13 pages.

* cited by examiner

*Primary Examiner*—Margaret G Moore

(57) ABSTRACT

Disclosed herein are polysiloxane-polycarbonate copolymer articles. In one embodiment, a $\frac{1}{8}^{th}$ inch thick bar formed from the thermoplastic composition has a B-Y ratio of less than or equal to about 1.75. This article, which has a dimension that is greater than or equal to 1.5 cm, comprises the thermoplastic composition which comprises a polysiloxane-polycarbonate copolymer, wherein the copolymer comprises repeating diorganosiloxane units of formula (1):

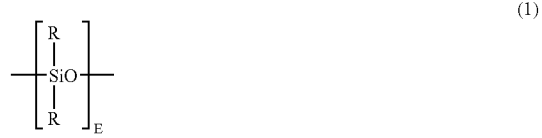

(1)

wherein each R is, independently, a $C_{1-13}$ monovalent organic group; and E has an average value of 20 to 35.

21 Claims, No Drawings

POLYSILOXANE-POLYCARBONATE COPOLYMER ARTICLE

BACKGROUND OF THE INVENTION

This disclosure relates to polycarbonate compositions, and in particular to articles comprising polysiloxane-polycarbonate compositions.

Thermoplastic compositions comprising polycarbonates are known for their impact strength, transparency, and melt-flow characteristics, and are used in the manufacture of articles and components for a wide range of applications, from automotive parts, to packaging materials, to electronic appliances. The properties of thermoplastic polycarbonate polymers may be further adjusted by the inclusion of discrete, compositionally different polymer units. Condensation copolymers comprising polyesters and polycarbonates, and particularly those compositions additionally comprising polysiloxanes, exhibit better low temperature ductility and thick section impact than corresponding non-polysiloxane-containing polyester polycarbonates.

However, copolymer combinations containing aromatic ester units, carbonate units, and siloxane units have been found to exhibit phase separation, as evidenced by low transparency and high degrees of haze. These optical characteristics can limit the utility and potential applications of such copolymers. There accordingly remains a need for copolymers containing aromatic ester units, carbonate units, and siloxane units wherein the melt flow and/or ductility properties of the combination is achieved while maintaining high transparency and low haze.

The ASTM D1003-00 haze measurement on a flat molded bar (typically ⅛ inch thickness) however, does not fully characterize the observed haze on the polycarbonate (PC) siloxane molded parts. Even for PC Siloxane samples which approach standard PC homopolymer in appearance when viewed through the flat surface of the part and when measured by standard ASTM D1003 method (that is 1% or lower haze), the edges of the samples show a very high level of visible haze as compared to PC homopolymer. This edge haze, which appears to be a result of dispersion of light by the siloxane domains as it passes through the part, is aesthetically unacceptable in many types of complex design molded parts, where these hazy edges are often visible through the otherwise clear part surfaces.

There accordingly remains a need in the art for PC siloxane molded parts with low edge haze.

SUMMARY OF THE INVENTION

Disclosed herein are polysiloxane-polycarbonate copolymer articles. In another embodiment, the article, which has a dimension that is greater than or equal to 1.5 cm, comprises a thermoplastic composition comprising a polysiloxane-polycarbonate copolymer, wherein the copolymer comprises repeating diorganosiloxane units of formula (1):

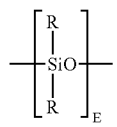

(1)

wherein each R is, independently, a $C_{1-13}$ monovalent organic group; and E has an average value of 20 to 35.

The above described and other features are exemplified by the following detailed description.

DETAILED DESCRIPTION OF THE INVENTION

Disclosed herein are polycarbonate (PC) siloxane compositions, methods of making the compositions, and molded articles made therefrom. As discussed above, edge haze is aesthetically unpleasing and commercially unacceptable. In some articles, a portion of the light entering the article is conducted to the edge surfaces thereby creating a colored visual effect at the edges; edge haze. Edge haze is an issue for articles that have a cross-sectional dimension (hereinafter referred to as a "haze dimension") that is sufficiently large such that, when viewed under fluorescent lighting and/or sunlight, with a black background, if the article had been formed from a composition comprising a polycarbonate polysiloxane composition having a D length of greater than 50, that portion of the article, when viewed directly, would have a visual effect that is visible to the naked eye, i.e., a "visible haze" also known as an "edge haze". This cross-sectional dimension can be any cross-section of the article that exhibits the visible haze, e.g., the depth, length, height, and/or through an article feature (e.g., protrusion (such as a rib, dimple, bar, and so forth), and/or through another portion of the article)).

As an example, a commonly used molded part for aesthetic evaluation of polymer materials is a so-called "color chip" which is 2 inches×3 inches×⅛ inch in dimensions. The two cross sectional dimensions of this part that would exhibit "edge haze" are the 2 inch and 3 inch dimensions, and the edge haze for those two dimensions would be viewed with, respectively, either the two inch or the three inch dimensions parallel with the line of sight of the viewer. Viewing this same part through the ⅛ inch dimension (i.e., the conventional means for viewing a flat molded part of this type) does not exhibit the visible edge haze since the re is insufficient depth of polymer material in ⅛ inch to cause sufficient light dispersion for it to be aesthetically unacceptable.

Without being bound by theory, it is believed that edge haze has been reduced in articles that have a haze dimension by utilizing polysiloxane blocks of a specific range of D-lengths to form a thermoplastic composition comprising a polysiloxane-polycarbonate copolymer. The thermoplastic composition can be transparent, having a transparency of greater than or equal to about 60%, or more specifically, greater than or equal to about 75%, or more specifically, greater than or equal to about 80%, as measured using ASTM D1003-00, procedure B using CIE standard illuminant C, e.g., depending on whether additives (e.g., colorants and/or others) have been used. The article can have a dimension whose cross-section is greater than or equal to 1.5 centimeters (cm), or, more specifically, greater than or equal to about 2.5 cm, or, even more specifically, greater than or equal to about 3.8 cm, and yet more specifically, greater than or equal to about 5.0 cm.

The polysiloxane-polycarbonate copolymer comprises repeating diorganosiloxane units of formula (1):

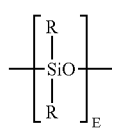

(1)

wherein each R is, independently, a $C_{1-13}$ monovalent organic group; and E has an average value of 20 to 35, or more specifically, 25 to 35, or, yet more specifically 25 to 30. It is noted that where E has an average value for example of 25, it may be referred to herein as D25.

As used herein, the terms "polycarbonate" and "polycarbonate resin" mean compositions having repeating structural carbonate units of the formula (2):

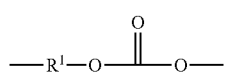

(2)

in which at least about 60 percent of the total number of $R^1$ groups are aromatic organic groups and the balance thereof are aliphatic, alicyclic, or aromatic groups. In one embodiment, each R1 is an aromatic organic group, for example a group of the formula (3):

(3)

wherein each of $A^1$ and $A^2$ is a monocyclic divalent aryl group and $Y^1$ is a bridging group having one or two atoms that separate $A^1$ from $A^2$. In an exemplary embodiment, one atom separates $A^1$ from $A^2$, with illustrative examples these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes bisphenol compounds of formula (4):

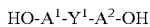

(4)

wherein $Y^1$, $A^1$ and $A^2$ are as described above. Included are bisphenol compounds of general formula (5):

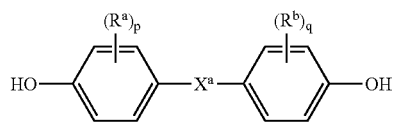

(5)

wherein $R^a$ and $R^b$ each represent a halogen atom or a monovalent hydrocarbon group and may be the same or different; p and q are each independently integers of 0 to 4; and $X^a$ represents one of the groups of formula (6):

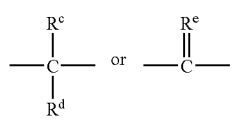

(6)

wherein $R^c$ and $R^d$ each independently represent a hydrogen atom or a monovalent linear alkyl or cyclic alkylene group and $R^e$ is a divalent hydrocarbon group. In an embodiment, $R^c$ and $R^d$ represent a cyclic alkylene group; or a heteroatom-containing cyclic alkylene group comprising carbon atoms and heteroatoms with a valency of two or greater. In an embodiment, a heteroatom-containing cyclic alkylene group comprises at least one heteroatom with a valency of 2 or greater, and at least two carbon atoms. Suitable heteroatoms for use in the heteroatom-containing cyclic alkylene group include —O—, —S—, and —N(Z)-, where Z is a substituent group selected from hydrogen, $C_{1-12}$ alkyl, $C_{1-12}$ alkoxy, or $C_{1-12}$ acyl. Where present, the cyclic alkylene group or heteroatom-containing cyclic alkylene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (7):

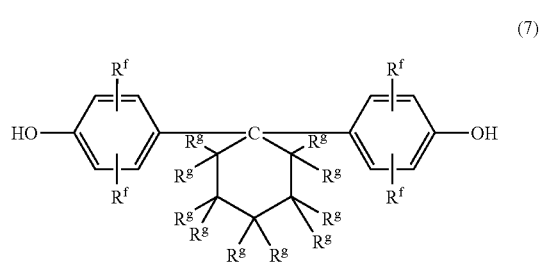

(7)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight-chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (8):

(8)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some exemplary dihydroxy compounds include: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4- hydroxyphenyl)adamantine, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl) propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

In one specific embodiment, the polycarbonate is a linear homopolymer derived from bisphenol A, which each of $A^1$ and $A^2$ is p-phenylene and $Y^1$ is isopropylidene in formula (4). The polycarbonates may have a weight average molecular weight of about 10,000 to about 200,000, specifically about 15,000 to about 100,000, or, more specifically, about 20,000 to about 50,000, as measured by gel permeation chromatography (GPC), using a crosslinked styrene-divinylbenzene column and calibrated to polycarbonate references. GPC samples are prepared at a concentration of about 1 mg/ml, and are eluted at a flow rate of about 1.5 ml/min.

In one embodiment, the polycarbonate has flow properties suitable for the manufacture of thin articles. Melt volume flow rate (often abbreviated MVR) measures the rate of extrusion of a thermoplastic composition through an orifice at a prescribed temperature and load. Polycarbonates suitable for the formation of thin articles can have an MVR, measured at 300° C./1.2 kg, of about 5 to about 60 cubic centimeters per 10 minutes (cm$^3$/10 min), specifically about 8 to about 45 cm$^3$/10 min, or, more specifically, about 8 to about 40 cm$^3$/10 min. Combinations of polycarbonates of different flow properties may be used to achieve the overall desired flow property.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, and combinations comprising at least one of homopolycarbonates and copolycarbonates. A specific type of copolymer is a polyester carbonate, also known as a polyester-polycarbonate. Such copolymers further contain, in addition to recurring carbonate chain units of the formula (2), repeating units of formula (9):

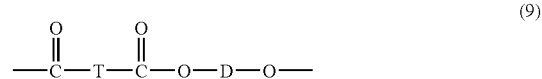

wherein D is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In one embodiment, D is a $C_{2-30}$ alkylene group having a straight chain, branched chain, or cyclic (including polycyclic) structure. In another embodiment, D is derived from an aromatic dihydroxy compound of formula (5) above. In another embodiment, D is derived from an aromatic dihydroxy compound of formula (8) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

Suitable polycarbonates can be manufactured by processes such as interfacial polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of about 0.05 to about 2.0 wt %. Mixtures comprising linear polycarbonates and branched polycarbonates may be used.

A chain stopper (also referred to as a capping agent) may be included during polymerization. The chain-stopper limits molecular weight growth rate, and so controls molecular weight in the polycarbonate. Exemplary chain-stoppers include certain mono-phenolic compounds, mono-carboxylic acid chlorides, and/or mono-chloroformates. Suitable mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and combinations thereof.

The polyester-polycarbonates may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or a combination comprising at least one of the foregoing, it is possible to employ isophthaloyl dichloride, terephthaloyl dichloride, and a combination comprising at least one of the foregoing.

In addition to the polycarbonate-polysiloxane copolymers described above, combinations of the polycarbonate-polysiloxane copolymers with other thermoplastic polymers may be used, so long as they are transparent and do not adversely affect the desired results set forth herein.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Useful polyesters may include aromatic polyesters, poly(alkylene esters) including poly(alkylene arylates), and poly(cycloalkylene diesters). Aromatic polyesters may have a polyester structure according to formula (9), wherein D and T are each aromatic groups as described hereinabove. In an embodiment, useful aromatic polyesters may include, for example, poly(isophthalate-terephthalate-resorcinol) esters, poly(isophthalate-terephthalate-bisphenol-A) esters, poly [(isophthalate-terephthalate-resorcinol) ester-co-(isophthalate-terephthalate-bisphenol-A)]ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) may have a polyester structure according to formula (9), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A specifically suitable poly(cycloalkylene diester) is poly(cyclohexanedimethylene terephthalate) (PCT). Combinations comprising at least one of the foregoing polyesters may also be used.

Copolymers comprising alkylene terephthalate repeating ester units with other suitable ester groups may also be useful. Specifically useful ester units may include different alkylene terephthalate units, which can be present in the polymer chain as individual units, or as blocks of poly(alkylene terephthalates). Specifically suitable examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Suitable poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (10):

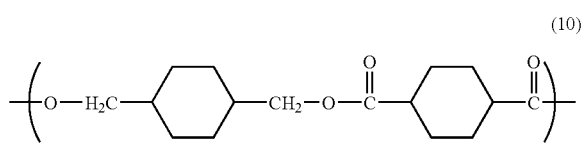

(10)

which is formula (9) where D is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The amount of polycarbonate and polyester employed is dependent upon attaining the desired optical and structural properties of the article. The polycarbonate and polyester may be used in a weight ratio of 1:99 to 99:1, specifically 10:90 to 90:10, and more specifically 30:70 to 70:30, depending on the function and properties desired.

It is desirable for such a polyester and polycarbonate blend to have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04.

The composition further comprises a polysiloxane-polycarbonate copolymer, also referred to as a polysiloxane-polycarbonate. The polydiorganosiloxane (also referred to herein as "polysiloxane") blocks of the copolymer comprise repeating diorganosiloxane units of formula (1):

(1)

wherein each occurrence of R is same or different, and is a $C_{1-13}$ monovalent organic group. For example, R may be a $C_1$-$C_{13}$ alkyl group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. Combinations comprising at least one of the foregoing R groups may be used in the same copolymer.

E in formula (1) has an average value of about 20 to about 35, specifically about 25 to about 35, and even more specifically, about 28 to about 33. A combination of a first and a second (or more) polycarbonate-polysiloxane copolymers may be used, wherein the average value of E of the first copolymer is less than the average value of E of the second copolymer.

The amount of siloxane in the polycarbonate-polysiloxane copolymer is 0.5 wt % to about 7 wt %, or, more specifically, about 1 wt % to about 6 wt %, or, even more specifically, about 2 wt % to about 5 wt %, and yet more specifically, about 3 wt % to about 5 wt %, based upon the total weight of the copolymer.

In one embodiment, the polydiorganosiloxane blocks are provided by repeating structural units of formula (11):

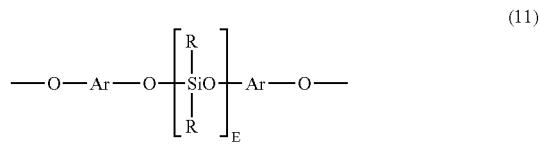

(11)

wherein E is as defined above; each R may be the same or different, and is as defined above; and Ar may be the same or different, and is a substituted or unsubstituted $C_6$-$C_{30}$ arylene group, wherein the bonds are directly connected to an aromatic moiety. Suitable Ar groups in formula (11) may be derived from a $C_6$-$C_{30}$ dihydroxyarylene compound, for example a dihydroxyarylene compound of formula (4), (5), or (8) above. Combinations comprising at least one of the foregoing dihydroxyarylene compounds may also be used. Specific examples of suitable dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds may also be used.

Such units may be derived from the corresponding dihydroxy compound of formula (12):

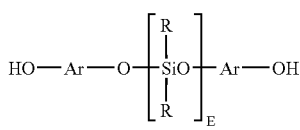

(12)

wherein Ar and E are as described above. Compounds of formula (12) may be obtained by the reaction of a dihydroxyarylene compound, for example, with an alpha, omega-bisacetoxypolydiorangonosiloxane under phase transfer conditions, or with alpha, omega dichloro polydiorganosiloxanes under anhydrous conditions.

In another embodiment, polydiorganosiloxane blocks comprises units of formula (13):

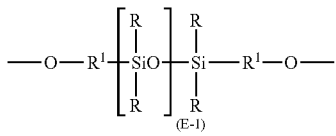

(13)

wherein R and E are as described above, and each occurrence of $R^1$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (14):

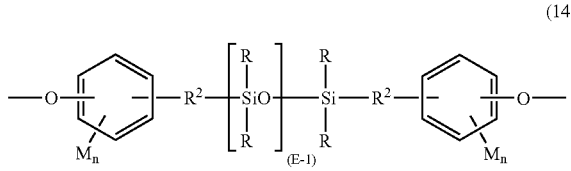

(14)

wherein R and E are as defined above. $R^2$ in formula (14) is a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

Units of formula (14) may be derived from the corresponding dihydroxy polydiorganosiloxane (15):

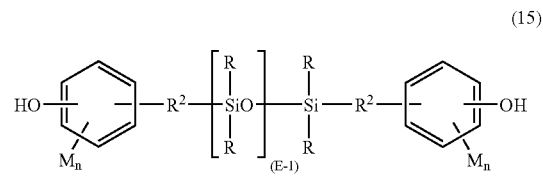

(15)

wherein R, E, M, $R^2$, and n are as described above. Such dihydroxy polysiloxanes can be made by effecting a platinum-catalyzed addition between an aliphatically unsaturated monohydric phenol and a siloxane hydride of formula (16):

(16)

wherein R and E are as previously defined. Suitable aliphatically unsaturated monohydric phenols included, for example, eugenol (4-allyl-2-methoxyphenol), 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing may also be used.

In addition to the polycarbonate resin, the thermoplastic composition may include various additives ordinarily incorporated in resin compositions of this type, with the proviso that the additives are selected so as to not significantly adversely affect the desired properties of the thermoplastic composition, particularly transparency. Combinations of additives may be used. Such additives may be mixed at a suitable time during the mixing of the components for forming the composition. Possible fillers and additives include: stabilizer(s) (thermal, UV, light, and the like), plasticizer(s), lubricant(s), antioxidant(s), antistatic agent(s), mold release agent(s), colorant(s), blowing agent(s), flame retardant(s), as well as combinations comprising at least one of the foregoing, such as those disclosed in commonly assigned U.S. patent application Ser. No. 11/025,249.

The thermoplastic composition can be employed to form articles wherein the articles have a dimension of greater than or equal to about 1.5 cm. The ductility is measured on ⅛ inch×2.5 inches×0.5 inch molded parts (e.g., "izod bars"). The ductility is measured by notched izod testing by the method ASTM D256-05. "Bars" (i.e., $\frac{1}{8}^{th}$ inch thick bars) formed from the composition have a B-Y span of less than or equal to about 9, wherein the B-Y span. The B-Y span is the difference between the Yellowness Index (YI) in transmission and the YI in reflectance of the transparent sample, and is calculated as:

$$B\text{-}Y\ \text{span} = \text{Transmission } YI - \text{Reflectance } YI$$

The B-Y span, as the difference between Transmission and Reflectance YI, is a measure of the dispersion of light that passes through the part, due to the fact that the dispersed light is disproportionately the shorter wavelength blue light which causes an increase in the yellowness as measured by the YI of the transmitted light. The B-Y span can also be expressed as a ratio; i.e., the B-Y span obtained from a molded part (the Bar) formed from the thermoplastic composition containing the siloxane co-polymer component divided by the B-Y span obtained from a molded part formed from the same thermoplastic composition except not containing the siloxane component. Bars ($1/8^{th}$ inch thick) formed from the thermoplastic composition employed to form the articles disclosed herein can have a B-Y ratio of less than or equal to 1.75, or, more specifically, less than or equal to 1.6 or, even more specifically, less than or equal to 1.5, and yet more specifically, less than or equal to 1.2.

Shaped, formed, or molded articles comprising the thermoplastic compositions are also provided. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, medical devices, home appliances (e.g., housewares and kitchen appliances), protective face shields, police riot shields, kettles (e.g., tea kettles, water kettles, and the like), membrane devices, and components of lighting fixtures, ornaments, roofs, greenhouses, sun rooms, swimming pool enclosures, and the like.

Other representative articles that may be fabricated using the thermoplastic compositions provided herein include headlamps, tail lamps, tail lamp housings; enclosures for electrical and telecommunication devices: outdoor furniture; boats and marine equipment, including trim, enclosures, and housings; building and construction applications such as glazing, roofs, windows; treated covers for pictures, paintings, posters, and like display items; optical lenses; ophthalmic lenses; corrective ophthalmic lenses; implantable ophthalmic lenses; wall panels and doors; protected graphics; outdoor and indoor signs; enclosures, housings, panels, and parts for automatic teller machines (ATM); window and door trim; sports equipment and toys, parts for snowmobiles; recreational vehicle panels and components; playground equipment; mobile phone housings; meter housings; coated helmets and personal protective equipment; coated synthetic or natural textiles; coated photographic film and photographic prints; food molds (e.g., chocolate molds, and so forth); and like applications. Additional fabrication operations may be performed on articles, such as, but not limited to molding, in-mold decoration, baking in a paint oven, lamination, and/or thermoforming.

EXAMPLES

Example 1

Preparation of D28.6-BCF via a Tube Process (EuSiD28.6-BCF Synthesis)

The method of U.S. Pat. No. 6,723,864 was used to make a $CH_2Cl_2$ solution of EuSiD28.6-BCF. Table I shows the details of the reactor operating conditions. A tube reactor was made from 5 Ko-Flo® static mixers in series. The reactor was fed with phosgene, a 20 wt % solution of eugenol-capped D28.6 siloxane (EuSiD28.6) in $CH_2Cl_2$, and a 15 wt % solution of NaOH in water. Product was collected over acid in a 3-L flask. The product was purged with nitrogen to eliminate the last traces of free phosgene.

Example 2

Preparation of D49.3-BCF via a Tube Process (EuSiD49.3-BCF Synthesis)

The method of Example 1 was repeated in a similar reactor to make a batch of EuSiD49.3 by replacing eugenol-capped D28.6 siloxane (EuSiD28.6) in $CH_2Cl_2$ with eugenol-capped D49.3 siloxane (EuSiD49.3) in $CH_2Cl_2$.

TABLE I

Eugenol Siloxane Bischloroformate Synthesis Conditions

|  | Example 1: D28.6 | Example 2: D49.3 |
|---|---|---|
| Number of mixers | 5 | 2 |
| Length of each mixer, inches | 7 | 11 |
| o.d. mixer, inches | 1/4 | 3/8 |
| Total volume reactor, mL | 15 | 37.7 |
| wt fraction NaOH vs. $H_2O$ | 0.15 | 0.15 |
| wt fraction EuSiDXX vs. $CH_2Cl_2$ | 0.20 | 0.20 |
| Feed rate $COCl_2$ (gm/min) | 2.00 | 4.0 |
| Feed rate EuSiDXX/$CH_2Cl_2$ (gm/min) | 24.66 | 80.3 |
| Feed rate NaOH/$H_2O$ (gm/min) | 30.00 | 43.1 |

TABLE II

Copolymer Synthesis

|  | Example 3: D28.6 | Example 4: D49.3 |
|---|---|---|
| BPA, gm | 1826.32 | 2282.9 |
| $CH_2Cl_2$, mL | 8244 | 10200 |
| $H_2O$, mL | 6660 | 8680 |
| TEA, mL | 11.2 | 14.0 |
| p-cumyl phenol, gm | 76.9 | 95.9 |
| $COCl_2$ total, gm | 950 | 1220 |

TABLE III

Solution Details

|  | Example 3: D28.6 | Example 4: D49.3 |
|---|---|---|
| wt fraction EuSiDXX-BCF | 0.272 | 0.234 |
| total solution added, gm | 478 | 673 |
| solution addition rate, mL/min | 80 | 83 |

Example 3

Preparation of 5 wt % Siloxane Content, D28.6 Copolycarbonate via Tube Process

A 30 L glass agitated reactor equipped with a reflux condenser, pH electrode, recirculation system, and agitator, was charged with BPA, $CH_2Cl_2$, $H_2O$, triethylamine (TEA), and p-cumyl phenol in the amounts shown in Table II. To this formulation, phosgene was added through a dip tube at 25 gm/min and a 50 wt % NaOH solution was added at a rate sufficient to maintain the pH in the vessel in the range of 10-10.5. After about 400 gm $COCl_2$ had been added, the pH in the vessel was increased, reaching a plateau of about 11.5 by the time about 475 gm $COCl_2$ had been added. Then the CH$_2$Cl$_2$ solution of EuSiD28.6-BCF prepared in Example 1 was added using the rate and total shown in Table III. During this addition, the pH in the vessel was maintained at about 11.5, and the phosgenation rate to the vessel was maintained at about 25 gm/min. After the EuSiD28.6-BCF addition was complete, the phosgenation rate was maintained at about 25 gm/min and the pH in the vessel was allowed to return to the range of about 10-10.5. After a total of 950 gm COCl$_2$ was added, the phosgenation was discontinued. After purging any residual COCl$_2$ from the vessel, the brine phase was separated, and the organic phase washed with an aqueous solution of HCl. Then the organic phase washed with water three times. The product was isolated from CH$_2$Cl$_2$ by antisolvent precipitation using methanol. The isolated product was dried in a vacuum oven at 80° C. overnight.

Example 4

Preparation of 5 wt % Siloxane Content, D49.3-Copolycarbonate Via Tube Process

The process outlined above was used with the conditions shown in Table I to prepare a CH$_2$Cl$_2$ solution of EuSiD49.3-BCF.

The 30 L reactor described above was charged with the formulation shown in Table II. To this formulation, phosgene was added through a dip tube at 25 gm/min and a 50 wt % NaOH solution was added at a rate sufficient to maintain the pH in the vessel in the range of 10-10.5. After about 495 gm COCl$_2$ had been added, the pH in the vessel was increased, reaching a plateau of about 11.5 by the time about 590 gm COCl$_2$ had been added. Then the CH$_2$Cl$_2$ solution of EuSiD49.3 prepared in Example 2 was added using the rate and total shown in Table II. During this addition, the pH in the vessel was maintained at about 11.5, and the phosgenation rate to the vessel was maintained at about 25 gm/min. After the EuSiD49.3-BCF solution addition was complete, the phosgenation rate was maintained at about 25 gm/min and the pH in the vessel was allowed to return to the range of about 10-10.5. After a total of 1220 gm COCl$_2$ was added, the phosgenation was discontinued. After purging any residual COCl$_2$ from the vessel, the brine phase was separated, and the organic phase washed with an aqueous solution of HCl. Then the organic phase washed with water three times. The product was isolated from CH$_2$Cl$_2$ by antisolvent precipitation using methanol. The isolated product was dried in a vacuum oven at 80° C. overnight.

Example 5

Preparation of 5 wt % Siloxane Content, D28.6 Copolycarbonate Via BCF/PTC Process

TABLE IV

| First Addition | | |
|---|---|---|
| | Example 5: D28.6 | Example 6: D49.3 |
| BPA, gm | 913.2 | 1141.5 |
| CH$_2$Cl$_2$, mL | 10700 | 10260 |
| H$_2$O, mL | 8910 | 8550 |
| TEA, mL | 0 | 0 |
| PTC, mL 75 wt % solution | 13 | 16 |
| COCl$_2$, gm | 590 | 740 |
| Eugenol Siloxane Oil, gm | 130 | 153 |

TABLE V

| Second Addition | | |
|---|---|---|
| | Example 5: D28.6 | Example 6: D49.3 |
| BPA, gm | 913 | 1141.5 |
| p-cumyl phenol, gm | 76.9 | 96.0 |
| TEA, mL | 8.4 | 8.0 |
| COCl$_2$, gm | 355 | 445 |

The 30 L vessel described above was charged with the materials shown in Table IV. PTC refers to "phase transfer catalyst", which was methyl tributyl ammonium chloride. To this mixture, phosgene was added at a rate of 25 gm/min until the total shown in Table IV was reached. During the phosgenation, a 50 wt % solution of NaOH was added at a rate sufficient to maintain the pH in the reaction vessel in the range of about 7-8. After the total phosgene shown in Table IV was delivered, the phosgenation was discontinued. Then, the pH was raised to about 11.8 by addition of 50 wt % NaOH. Once this pH was achieved, eugenol siloxane oil was added over the course of about 1 minute (total amount shown in Table IV).

At about 10 minutes after the addition of eugenol siloxane oil was complete, the amount of BPA shown in Table V was added. The pH of the mixture decreased from about 11.8 to about 8.5 over the course of about 3 minutes. After about 5 minutes, the p-cumyl phenol shown in Table V was added. After about 2 minutes, the TEA shown in Table V was added. After this, the COCl$_2$ shown in Table V was added at a rate of about 20 gm/min, while maintaining the pH at about 10-10.5 by addition of 50 wt % NaOH.

This mixture washed, isolated, and dried according to the method given in Example 3.

Example 6

Preparation of 5 wt % Siloxane Content, D50-Copolycarbonate Via BCF/PTC Process

Example 5 was repeated using EuSiD49.3 oil, and the product was purified, isolated, and dried according to the method used in Example 3.

Table VI represents the results of B-Y Span measurements for samples having D lengths from 11 to 47.

TABLE VI

| Sample | Process | D Length | % Si | B-Y Span | B-Y Ratio |
|---|---|---|---|---|---|
| PC | | | | 5.2 | — |
| 1 | PTC | 11 | 5 | 5.9 | 1.1 |
| 2 | PTC | 20 | 5 | 6.2 | 1.2 |
| 3 | PTC | 30 | 5 | 7.9 | 1.5 |
| 4 | PTC | 40 | 5 | 11.9 | 2.3 |
| 5 | PTC | 47 | 5 | 14.1 | 2.7 |
| 6 | PTC | 11 | 2 | 5.9 | 1.1 |
| 7 | PTC | 20 | 2 | 6.2 | 1.2 |
| 8 | PTC | 30 | 2 | 7.4 | 1.4 |
| 9 | PTC | 40 | 2 | 9.5 | 1.8 |
| 10 | PTC | 47 | 2 | 14.1 | 2.7 |
| 11 | Tube | 11 | 5 | 5.8 | 1.1 |
| 12 | Tube | 20 | 5 | 6.3 | 1.2 |
| 13 | Tube | 26 | 5 | 6.8 | 1.3 |
| 14 | Tube | 30 | 5 | 7.4 | 1.4 |
| 15 | Tube | 30 | 5 | 7.1 | 1.4 |
| 16 | Tube | 35 | 5 | 8.4 | 1.6 |
| 17 | Tube | 40 | 5 | 10.7 | 2.1 |
| 18 | Tube | 47 | 5 | 13.3 | 2.6 |
| 19 | Tube | 11 | 2 | 5.9 | 1.1 |

TABLE VI-continued

| Sample | Process | D Length | % Si | B-Y Span | B-Y Ratio |
|---|---|---|---|---|---|
| 20 | Tube | 20 | 2 | 6.4 | 1.2 |
| 21 | Tube | 30 | 2 | 7.0 | 1.3 |
| 22 | Tube | 40 | 2 | 8.7 | 1.7 |
| 23 | Tube | 47 | 2 | 11.2 | 2.2 |

Yellowness Index (YI) measurements were made on a MacBeth Spectrophotometer Color Eye 7000a, manufactured by GretagMacbeth AG. Instrument settings were D65 illuminant, 10 degree angle, and UV included. YI in reflectance was measured by first calibrating the instrument in reflection mode using zero calibration and white calibration tile, then measuring YI of the sample by holding the sample at the outer port of the instrument with no backing and without use of the sample holder so as to allow the transmitted light to pass through the sample. YI in transmission was measured with a standard white tile backing according to ASTM E313-73 (D1925).

B-Y span is indicative of edge haze; i.e., as the B-Y span increases, the amount of edge haze observed also increases. As can be seen from Table VI, for the tube process and a siloxane content of 5 wt % (5% Si), edge haze for a D length of 11 to a D length of 20 (B-Y span of about 6.3) hardly changes, with some change at a D length of 26 (B-Y span of 6.8) and a D length of 30 (B-Y span of less than 7.5), with a D length of 35 (B-Y span was less than 8.5). However, unexpectedly, a substantial change is observed at a D length of 40 (B-Y span of greater than 10.5) and a D length of 47 (B-Y span of greater than 13). This difference is also readily apparent in visual observation of the edges of the samples. Visually, the D11 to D30 samples are nearly indistinguishable, while, in contrast, there is a marked increase in the visible edge haze for the D40 and D47 samples, as compared to D11 to D30. This correlation of the actual visual appearance of the samples to the B-Y span measurement provides corroboration that the B-Y span and B-Y ratio is in fact a measurement that is useful in regard to the appearance properties of these materials.

Table VII sets for the data for the Notch Izod tests at 0° C. and 23° C. and at varying degrees of sharpness of the notch radius. (Note that 0.25 mm radius is the standard notch radius for this test.). The ductility was measured on ⅛ inch×2.5 inches×0.5 inch molded parts (e.g., izod bars) in accordance with ASTM D256-05. Each test was performed on 5 bars with the notch radius as set forth in the table. If all five bars failed in a brittle manner the result is reported as "B". If all five bars failed in the ductile manner, the result is reported as "D". For samples with both brittle and ductile failures, the number of bars with each type failure is reported. As is illustrated by the data, a substantial decrease in the preferred ductile impact performance is seen at less than or equal to D20, while at D30 and above, substantially the same results were obtained.

TABLE VII

| | | | | Notch Izod | | | | | |
|---|---|---|---|---|---|---|---|---|---|
| | | | | Notch Radius (0° C.) in (mm) | | | Notch Radius (23° C.) (mm) | | |
| Sample | Process | D Length | % Si | 0.0625 | 0.125 | 0.25 | 0.0625 | 0.125 | 0.25 |
| PC | | | | B | B | D | B | B | D |
| 1 | PTC | 11 | 5 | B | B | D | B | B | D |
| 2 | PTC | 20 | 5 | 3B 2D | D | D | D | D | D |
| 3 | PTC | 30 | 5 | D | D | D | D | D | D |
| 4 | PTC | 40 | 5 | D | D | D | D | D | D |
| 5 | PTC | 47 | 5 | D | D | D | D | D | D |
| 6 | PTC | 11 | 2 | B | B | D | B | B | D |
| 7 | PTC | 20 | 2 | B | B | D | B | B | D |
| 8 | PTC | 30 | 2 | B | B | D | D | D | D |
| 9 | PTC | 40 | 2 | B | 3B 2D | D | D | D | D |
| 10 | PTC | 47 | 2 | B | 3B 2D | D | D | D | D |
| 11 | Tube | 11 | 5 | B | B | D | B | B | D |
| 12 | Tube | 20 | 5 | B | B | D | D | D | D |
| 14 | Tube | 30 | 5 | D | D | D | D | D | D |
| 17 | Tube | 40 | 5 | D | D | D | D | D | D |
| 18 | Tube | 47 | 5 | D | D | D | D | D | D |
| 19 | Tube | 11 | 2 | B | B | 4B 1D | B | B | D |
| 20 | Tube | 20 | 2 | B | B | D | B | B | D |
| 21 | Tube | 30 | 2 | B | B | D | D | D | D |
| 22 | Tube | 40 | 2 | B | B | D | D | D | D |
| 23 | Tube | 47 | 2 | B | B | D | 2B 3D | D | D |

Table VIII sets for the data for the Notch Izod testing using standard testing conditions with samples tested at 23° C. and at temperatures from −10° C. to as low as −50° C. For a given sample, testing was conducted at lower temperatures to the point where the bars transitioned from a ductile manner of failure to a brittle manner of failure. Reported in the table is the lowest temperature at which all five bars tested failed in the preferred ductile manner (i.e., 100% ductile), with a lower temperature for 100% ductility being the measurement in this testing indicating improved ductility. As can be seen from Table VIII, as the D length increases, the 100% ductility temperature decreases. However, at a D length of about 30, the 100% ductility temperature (less than or equal to about −30, and even less than or equal to about −40° C.) is substantially lower than pure polycarbonate (PC), which has a 100% ductility temperature of −10° C. or higher. Hence, at a D length of about 20 to about 35, the edge haze can be substantially reduced while attaining substantially improved ductility compared to standard polycarbonate, and retaining the improved ductility compared to compositions comprising siloxane with a D length of about 47 (e.g., 100% ductility down to less than −50° C.). Ductility of 100% can be obtained with the thermoplastic composition with the polysiloxane having D20-D35, even with blends comprising the thermoplastic composition, at a temperature of 0° C., or, more specifically, −20° C., or, even more specifically, −30° C., and even lower as discussed above and shown below.

As the D length decreases, while edge haze gets lower (i.e., optical quality improves), low temperature impact is gradually lost and approaches polycarbonate values. On the other hand, as D length increases while the low temperature impact is improved, edge haze gets worse and approaches near opacity.

TABLE VIII

| Sample | Process | D Length | % Si | Lowest Temperature with 100% ductility (° C.) | MVR cm³/10 min |
|---|---|---|---|---|---|
| 1 | PTC | 11 | 5 | −10 | 14.67 |
| 2 | PTC | 20 | 5 | −30 | 7.93 |
| 3 | PTC | 30 | 5 | −50 | 7.73 |
| 4 | PTC | 40 | 5 | −40 | 7.25 |
| 5 | PTC | 47 | 5 | −50 | 7.24 |
| 6 | PTC | 11 | 2 | −10 | 15.38 |
| 7 | PTC | 20 | 2 | −20 | 12.25 |
| 8 | PTC | 30 | 2 | −20 | 13.64 |
| 9 | PTC | 40 | 2 | −30 | 12.62 |
| 10 | PTC | 47 | 2 | −30 | 12.48 |
| 11 | Tube | 11 | 5 | 23 | 15.58 |
| 12 | Tube | 20 | 5 | −20 | 9.58 |
| 14 | Tube | 30 | 5 | −40 | 8.42 |
| 17 | Tube | 40 | 5 | −50 | 8.22 |
| 18 | Tube | 47 | 5 | −50 | 9.27 |
| 19 | Tube | 11 | 2 | 23 | 17.97 |
| 20 | Tube | 20 | 2 | −20 | 12.96 |
| 21 | Tube | 30 | 2 | −20 | 12.45 |
| 22 | Tube | 40 | 2 | −30 | 13.58 |
| 23 | Tube | 47 | 2 | −50 | 14.67 |

It was unexpectedly discovered that the D-length significantly affects the Notch Izod strength as well as the edge haze, with drastic changes occurring at about D25—D35.

With the use of the thermoplastic composition comprising the polysiloxane-polycarbonate copolymer, wherein the polysiloxane has D lengths of 20-35, articles comprising reduced haze through a dimension of greater than 1.27 cm have unexpectedly been attained. Transparent articles with haze, e.g., edge haze, are commercially less desirable. Reduction, and in some cases, elimination of the haze (e.g., edge haze) enhances the commercial worth of the composition and articles made therefrom.

It should be noted that the singular forms "a," "an," and "the" include plural referents unless the context clearly dictates otherwise. Unless defined otherwise, technical and scientific terms used herein have the same meaning as is commonly understood by one of skill in the art to which this invention belongs. The modifier "about" used in connection with a quantity is inclusive of the stated value and has the meaning dictated by the context (e.g., includes the degree of error associated with measurement of the particular quantity). The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.). The suffix "(s)" as used herein is intended to include both the singular and the plural of the term that it modifies, thereby including at least one of that term (e.g., the colorant(s) includes at least one colorants). Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. An article, comprising:
a thermoplastic composition comprising
a polysiloxane-polycarbonate copolymer, wherein the copolymer comprises repeating diorganosiloxane units of formula (1):

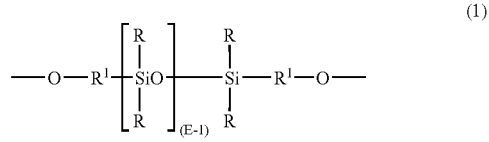

wherein each R is, independently, a $C_{1-13}$ monovalent organic group, each occurrence of $R^1$ is independently a divalent $C_1$-$C_{30}$ alkylene, and E has an average value of about 20 to about 35;
wherein the article is transparent and has a dimension that is greater than or equal to about 1.5 cm;
wherein the thermoplastic composition is defined in that an $\frac{1}{8}^{th}$ inch thick bar formed from the thermoplastic composition has a B-Y ratio of less than or equal to about 1.75, wherein the B-Y ratio is determined as a B-Y span of a molded part formed from the thermoplastic composition divided by a B-Y span of a molded part formed from a siloxane-free thermoplastic composition, the siloxane-free thermoplastic composition having a composition identical to that of the thermoplastic composition except for the omission of the diorganosiloxane units; and
wherein the thermoplastic composition has about 2 wt % to about 6 wt % polysiloxane.

2. The article of claim 1, wherein the bar has 100% ductility at −20° C. in accordance with ASTM D256-05 with an impact energy of at least 10 ft-lb/in.

3. The article of claim 2, wherein the bar has 100% ductility at −30° C.

4. The article of claim 1, wherein the B-Y ratio is less than or equal to about 1.6.

5. The article of claim 4, wherein the B-Y ratio is less than or equal to about 1.5.

6. The article of claim 5, wherein the B-Y ratio is less than or equal to about 1.2.

7. The article of claim 1, wherein the dimension is greater than or equal to about 2.5 cm.

8. The article of claim 1, wherein the thermoplastic composition comprises about 3 wt % to about 5 wt % polysiloxane.

9. The article of claim 1, wherein the E has an average value of about 25 to about 35.

10. The article of claim 9, wherein the E has an average value of about 30 to about 35.

11. The article of claim 9, wherein the E has an average value of about 25 to about 30.

12. An article, comprising:
a thermoplastic composition comprising
a polysiloxane-polycarbonate copolymer, wherein the copolymer comprises repeating diorganosiloxane units of formula (1):

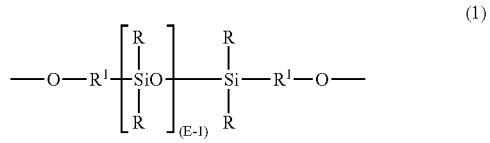

(1)

wherein each R is, independently, a $C_{1-13}$ monovalent organic group, each occurrence of $R^1$ is independently a divalent $C_1$-$C_{30}$ alkylene, and E has an average value of about 25 to about 35;
wherein the article has a dimension having a cross-section that is greater than or equal to 1.5 cm; and
wherein the composition is defined in that a $1/8^{th}$ inch thick bar formed from the thermoplastic composition has a B-Y ratio of less than or equal to about 1.6, wherein the B-Y ratio is determined as a B-Y span of a molded part formed from the thermoplastic composition divided by a B-Y span of a molded part formed from a siloxane-free thermoplastic composition, the siloxane-free thermoplastic composition having a composition identical to that of the thermoplastic composition except for the omission of the diorganosiloxane units.

13. The article of claim 12, wherein the bar has 100% ductility at $-0°$ C. in accordance with ASTM D256-05 with an impact energy of at least 10 ft-lb/in.

14. The article of claim 13, wherein the bar has 100% ductility at $-10°$ C. in accordance with ASTM D256-05 with an impact energy of at least 10 ft-lb/in.

15. The article of claim 12, wherein the thermoplastic composition comprises about 2 wt % to about 5 wt % polysiloxane, based upon a total weight of the copolymer.

16. The article of claim 15, wherein the thermoplastic composition comprises about 3 wt % to about 5 wt % polysiloxane.

17. The article of claim 15, wherein the E has an average value of about 30 to about 35.

18. The article of claim 15, wherein the E has an average value of about 25 to about 30.

19. The article of claim 15, wherein the B-Y ratio is less than or equal to about 1.5.

20. The article of claim 15, wherein the B-Y ratio is less than or equal to about 1.2.

21. A method of forming an article, the method comprising:
disposing a thermoplastic composition, the thermoplastic composition comprising a polysiloxane-polycarbonate copolymer, wherein the copolymer comprises repeating diorganosiloxane units of formula (1):

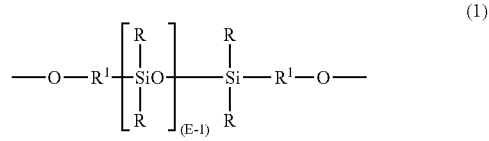

(1)

wherein each R is, independently, a $C_{1-13}$ monovalent organic group, each occurrence of $R^1$ is independently a divalent $C_1$-$C_{30}$ alkylene, and E has an average value of greater than or equal to 20 to less than or equal to 35; wherein the article is transparent and has a dimension that is greater than or equal to about 1.5 cm; wherein the thermoplastic composition is defined in that an $1/8^{th}$ inch thick bar formed from the thermoplastic composition has a B-Y ratio of less than or equal to about 1.75, wherein the B-Y ratio is determined as a B-Y span of a molded part formed from the thermoplastic composition divided by a B-Y span of a molded part formed from a siloxane-free thermoplastic composition, the siloxane-free thermoplastic composition having a composition identical to that of the thermoplastic composition except for the omission of the diorganosiloxane units; and wherein the thermoplastic composition has about 2 wt % to about 6 wt % polysiloxane; and
forming an article.

* * * * *